United States Patent
Uozumi

(10) Patent No.: US 7,292,184 B2
(45) Date of Patent: Nov. 6, 2007

(54) POSITIONING SYSTEM, POSITIONING TERMINAL, INFORMATION PROVISION DEVICE, POSITIONING METHOD, CONTROL PROGRAM FOR POSITIONING SYSTEM, AND COMPUTER-READABLE RECORDING MEDIUM FOR RECORDING CONTROL PROGRAM FOR POSITIONING SYSTEM

(75) Inventor: Hiroshi Uozumi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 242 days.

(21) Appl. No.: 11/206,737

(22) Filed: Aug. 19, 2005

(65) Prior Publication Data

US 2006/0038717 A1    Feb. 23, 2006

(30) Foreign Application Priority Data

Aug. 23, 2004   (JP)   ............... 2004-241927

(51) Int. Cl.
*G01S 7/185* (2006.01)
*H04Q 7/20* (2006.01)

(52) U.S. Cl. .............. 342/357.09; 455/456.6; 455/456.1

(58) Field of Classification Search ............... 455/456; 342/357.09, 357.06
See application file for complete search history.

(56) References Cited

U.S. PATENT DOCUMENTS

| 6,133,874 A | 10/2000 | Krasner |
| 6,584,404 B1 | 6/2003 | McBurney et al. |
| 6,937,867 B2 * | 8/2005 | Oda et al. ................ 455/456.1 |
| 7,149,534 B2 * | 12/2006 | Bloebaum et al. ........ 455/456.6 |
| 2003/0045303 A1 | 3/2003 | Oda et al. |
| 2003/0083816 A1 | 5/2003 | Imakado et al. |

FOREIGN PATENT DOCUMENTS

| JP | H06-051047 A | 2/1994 |
| JP | 2000131415 A | 5/2000 |
| JP | 2003-70051 A | 3/2003 |
| JP | 2003139841 A | 5/2003 |
| JP | 2004-013840 A | 1/2004 |
| JP | 2004-040171 A | 2/2004 |

* cited by examiner

*Primary Examiner*—Thomas Tarcza
*Assistant Examiner*—Harry Liu
(74) *Attorney, Agent, or Firm*—Global IP Counselors, LLP

(57) ABSTRACT

A positioning system that uses a positioning terminal, an information provision device, and a communication network. The information provision device is configured to perform position calculations for the positioning terminal only when the results of position calculations can be considered to be successful. Thus, a load on the information provision device can be reduced.

8 Claims, 11 Drawing Sheets

| SATELLITE NUMBER | ELEVATION ANGLE (°) |
|---|---|
| 15 | 80 |
| 21 | 70 |
| 16 | 45 |
| 17 | 30 |
| 20 | 20 |

IN CASE WHERE POSITIONING HAS BEEN SUCCESSFUL

153

| POSITIONING success or failure | YES |
|---|---|

| INDEX (152a) | SATELLITE NUMBER (152b) | CODE PHASE (chips) (152c) | USED FOR POSITION CALCULATION (154) |
|---|---|---|---|
| 1 | 6 | 35 | No |
| 2 | 15 | 128 | Yes |
| 3 | 21 | 47 | Yes |
| 4 | 3 | 87 | No |
| 5 | 5 | 40 | No |
| 6 | 16 | 75 | Yes |
| 7 | 17 | 12 | Yes |
| 8 | 20 | 90 | Yes |

FIG.7B

IN CASE WHERE POSITIONING HAS FAILED ED

| INDEX (152a) | SATELLITE NUMBER (152b) | CODE PHASE (chips) (152c) | USED FOR POSITION CALCULATION (154) |
|---|---|---|---|
| 1 | 6 | – | No |
| 2 | 15 | 128 | Yes |
| 3 | 21 | 47 | Yes |
| 4 | 3 | – | No |
| 5 | 5 | – | No |
| 6 | 16 | – | No |
| 7 | 17 | – | No |
| 8 | 20 | – | No |

POSITIONING SYSTEM, POSITIONING TERMINAL, INFORMATION PROVISION DEVICE, POSITIONING METHOD, CONTROL PROGRAM FOR POSITIONING SYSTEM, AND COMPUTER-READABLE RECORDING MEDIUM FOR RECORDING CONTROL PROGRAM FOR POSITIONING SYSTEM

CROSS-REFERENCE TO RELATED APPLICATIONS

This application claims priority to Japanese Patent Application No. 2004-241927. The entire disclosure of Japanese Patent Application No. 2004-241927 is hereby incorporated herein by reference.

BACKGROUND OF THE INVENTION

1. Field of the Invention

The present invention generally relates to a positioning system. More specifically, the present invention relates to a positioning system, a positioning terminal, an information provision device, a positioning method, a control program for a positioning system, and a computer-readable recording medium for recording a control program for a positioning system.

2. Background Information

A GPS (Global Positioning System) for positioning utilizing position information satellites has been widely used. In order to receive position-related signals transmitted from GPS satellites and to calculate the position of the reception point, since it is necessary to perform calculations using massive amounts of such as acquisition of GPS satellites, decoding of position-related signals, and calculation of pseudo range, a high-end CPU (Central Processing Unit) is required. This requirement becomes an obstacle to miniaturization and price-reduction in GPS receiving devices.

In Japanese Patent Application Publication No. 2000-131415 (FIG. 1 etc.), a GPS positioning system is disclosed in which part of the functions necessary for positioning calculations is provided by a server, information obtained by a GPS receiving terminal is transmitted to the server, and position calculation is performed by the server is disclosed. Such a positioning system is called a server-assist system. Japanese Patent Application Publication No. 2000-131415

In the invention of Japanese Patent Application Publication No. 2000-131415 (FIG. 1 etc.), since the GPS receiving terminal is arranged to transmit all information obtained from the GPS satellites to the server without any particular differentiation, the transmitted information includes unnecessary information for position calculation. Thus, an extra load is applied to the server which can be problematic.

Accordingly, in Japanese Patent Application Publication No. 2003-139841 (FIG. 3 etc.), in a portable terminal with built-in GPS used in a server-assist positioning system, a configuration is disclosed in which information to be transmitted to a server is selected according to an acquisition result of GPS satellites for reducing a load on the server. Japanese Patent Application Publication No. 2003-139841 is hereby incorporated by reference.

In the GPS system, essentially, if it is possible that four GPS satellites are acquired, three-dimensional positioning can be performed. However, even if four GPS satellites can be acquired, depending on the arrangement of those acquired GPS satellites, sometimes DOP (Dilution of Precision) becomes larger and positioning can not be performed.

In the portable terminal with built-in GPS in the Publication No. 2003-139841, information to be transmitted to the server is selected using elevation of the acquired GPS satellites or electric field intensity as reference. Accordingly, there is a problem in that the server performs position calculations and CPU time is wasted even when the GPS satellite arrangement is not preferable and position calculation is impossible.

In view of the above, it will be apparent to those skilled in the art from this disclosure that there exists a need for an improved a positioning system, a positioning terminal, an information provision device, a positioning method, a control program for a positioning system, and a computer-readable recording medium for recording a control program for a positioning system. This invention addresses this need in the art as well as other needs, which will become apparent to those skilled in the art from this disclosure.

SUMMARY OF THE INVENTION

An object of the present invention is to provide a positioning system, a positioning terminal, an information provision device, a positioning method, a control program for a positioning system, and a computer-readable recording medium for recording a control program for a positioning system, by which a load on a server can be reduced because the information provision device performs position calculations only when the position calculation is possible.

According to a first aspect of the present invention, a positioning system includes a positioning terminal, an information provision device, and a communication network. The positioning terminal performs positioning using position information satellites. The information provision device provides positioning aiding information to the positioning terminal. The communication network is provided for the positioning terminal to communicate with the information provision device. The positioning terminal has a positioning aiding information transmission requesting unit, a positioning aiding information receiving unit, a positioning basic information obtaining unit, a terminal side position calculating unit, a positioning basic information transmitting unit, a positioning success or failure information generating unit, and a positioning success or failure information transmitting unit. The positioning aiding information transmission requesting unit requests the information provision device to transmit positioning aiding information through the communication network. The positioning aiding information receiving unit receives the positioning aiding information transmitted by the information provision device through the communication network. The positioning basic information obtaining unit acquires the position information satellites and obtains the positioning basic information from positioning-related signals transmitted by the position information satellites. The terminal side position calculating unit calculates a position of the positioning terminal based on the positioning aiding information and the positioning basic information. The positioning basic information transmitting unit transmits the positioning basic information to the information provision device through the communication network. The positioning success or failure information generating unit generates positioning success or failure information indicating whether the terminal side position calculating unit has successfully calculated the position of the positioning terminal or not. The positioning success or failure information transmitting unit transmits the positioning success or failure information to the information provision device through the communication network. The information provision device has a positioning aiding information obtaining unit, a positioning aiding information transmitting unit, a positioning basic information receiving unit, a positioning success or failure information receiving unit, an information provision device side position calculating unit, and a positioning execution go or no-go determining unit. The positioning aiding information obtaining unit obtains the positioning aiding information. The positioning aiding information transmitting unit transmits the positioning aiding information to the positioning terminal through the communication network. The positioning basic information receiving unit receives the positioning basic information transmitted by the positioning terminal through the communication network. The positioning success or failure information receiving unit receives the positioning success or failure information transmitted by the positioning terminal through the communication network. The information provision device side position calculating unit calculates the position of the positioning terminal based on the positioning aiding information and the positioning basic information. The positioning execution go or no-go determining unit determines whether the information provision device side position calculating unit performs position calculation of the positioning terminal or not based on the positioning success or failure information.

According to the aforementioned configuration, the positioning terminal can obtain the positioning aiding information transmitted by the information provision device using the positioning aiding information receiving unit. Here, the positioning aiding information refers to information required to acquire data from the position information satellites and includes information on orbits of the position information satellites. It is not necessary to obtain directly the positioning aiding information from signals transmitted by the position information satellites at a point to be located.

The positioning terminal that has obtained the positioning aiding information acquires the position information satellites and obtains the positioning basic information using the positioning basic information obtaining unit. Here, the positioning basic information is information required to be directly obtained from signals transmitted by the position information satellites at a point to be located and includes a code phase necessary for calculation of a pseudo range. The positioning terminal transmits the positioning basic information to the information provision device using the positioning basic information transmitting unit.

Since the positioning terminal has the terminal side position calculating unit, it attempts to calculate the position of the positioning terminal based on the obtained positioning basic information. However, the positioning calculation sometimes results in failure. For example, it happens when the arrangement of the acquired position information satellites is not good in the sky and the iterative calculation to solve positioning equations is not converged within predetermined times. The positioning success or failure information generating unit of the positioning terminal generates positioning success or failure information indicating whether the positioning calculation by the terminal side position calculating unit has been successful or not, and the positioning success or failure information transmitting unit transmits the positioning success or failure information to the information provision device.

The positioning success or failure information receiving unit of the information provision device receives the positioning success or failure information transmitted from the positioning terminal, and the positioning execution go or no-go determining unit determines whether the position calculation of the positioning terminal is possible or not based on the positioning success or failure information. The information provision device performs position calculation of the positioning terminal using the information provision device side position calculating unit only when the received positioning basic information indicates that the position calculation has been successful in the positioning terminal, and does not perform the position calculation when the positioning success or failure information indicates that the position calculation by the positioning terminal has failed.

Thus, according to the configuration, since the information provision device performs position calculations for the positioning terminal only when the results of the position calculations can be considered to be successful, a positioning system capable of reducing the load on the information provision device can be provided.

A positioning system according to a second aspect of the present invention is the system of the first aspect, wherein the positioning terminal has a terminal side satellite selecting unit, a selection result information generating unit, and a selection result information transmitting unit. The terminal side satellite selecting unit selects the position information satellites used by the terminal side position calculating unit for position calculation of the positioning terminal from the position information satellites acquired by the positioning basic information obtaining unit. The selection result information generating unit generates selection result information indicating the position information satellites selected by the terminal side satellite selecting unit. The selection result information transmitting unit transmits the selection result information to the information provision device through the communication network. Further, the information provision device has a selection result information receiving unit and an information provision device side satellite selecting unit. The selection result information receiving unit receives the selection result information transmitted by the positioning terminal through the communication network. The information provision device side satellite selecting unit selects the position information satellites used by the information provision device side position calculating unit for position calculation of the positioning terminal based on the selection result information.

According to the aforementioned configuration, if it is possible for the positioning basic information obtaining unit to acquire a larger number of position information satellites than the smallest number of position information satellites required for position calculation (three in the case of two-dimensional positioning, four in the case of three-dimensional positioning), the terminal side satellite selecting unit selects the position information satellites actually used for position calculation from the successfully acquired position information satellites. This selection is performed with reference to parameters such as signal intensity of the position-related signals transmitted from the respective satellites, elevation angles of the respective satellites from the observation point, and positional relationships between satellites. If it is possible for a large number of satellites to be acquired, the calculation amount for selection becomes larger.

The selection result information generating unit generates selection result information indicating the selection results performed by the terminal side satellite selecting unit, and the selection result information transmitting unit transmits the selection result information to the information provision device.

The selection result information receiving unit of the information provision device receives the selection result information transmitted from the positioning terminal. The server side satellite selecting unit selects the same position information satellites as those selected and actually used by the terminal based on the selection result information. Accordingly, the calculation amount when the server side satellite selecting unit selects position information satellites used for position calculation can be reduced.

A positioning system according to a third aspect of the present invention is the system of the second aspect, wherein the terminal side satellite selecting unit of the positioning terminal calculates PDOP (Position Dilution of Precision) based on an arrangement of the position information satellites acquired by the positioning basic information obtaining unit and selects the position information satellites used by the terminal side position calculating unit for position calculation of the positioning terminal so that the PDOP may be the minimized.

According to this configuration, the terminal side satellite selecting unit of the positioning terminal selects the position information satellites used for position calculation so that the PDOP may be the minimized. Accordingly, unlike a case in which they are selected based on the signal intensity of position-related signals or elevation angles, a combination of position information satellites by which positioning is impossible is never selected and wasteful position calculation by the information provision device can be avoided.

According to a fourth aspect of the present invention, a positioning terminal acquires positioning aiding information from an information provision device through a communication network and performs positioning utilizing position information satellites. The terminal includes a positioning aiding information transmission requesting unit, a positioning aiding information receiving unit, a positioning basic information obtaining unit, a terminal side position calculating unit, a positioning basic information transmitting unit, a positioning success or failure information generating unit, and a positioning success or failure information transmitting unit. The positioning aiding information transmission requesting unit requests the information provision device to transmit positioning aiding information through the communication network. The positioning aiding information receiving unit receives the positioning aiding information transmitted by the information provision device through the communication network. The positioning basic information obtaining unit acquires the position information satellites and obtains the positioning basic information from positioning-related signals transmitted by the position information satellites. The terminal side position calculating unit calculates a position of the positioning terminal based on the positioning aiding information and the positioning basic information. The positioning basic information transmitting unit transmits the positioning basic information to the information provision device through the communication network. The positioning success or failure information generating unit generates positioning success or failure information indicating whether the terminal side position calculating unit has successfully calculated the position of the positioning terminal or not. The positioning success or failure information transmitting unit transmits the positioning success or failure information to the information provision device through the communication network.

According to this configuration, since the information provision device can obtain the positioning success or failure information from the positioning terminal, it can avoid the positioning calculation based on the positioning basic information with which the positioning calculation is impossible.

According to a fifth aspect of the present invention, an information provision device provides positioning aiding information to a positioning terminal to perform positioning utilizing position information satellites through a communication network. The device includes a positioning aiding information obtaining, a positioning aiding information transmitting unit, a positioning basic information receiving unit, a positioning success or failure information receiving unit, an information provision device side position calculating unit, and a positioning execution go or no-go determining unit. The positioning aiding information obtaining unit obtains the positioning aiding information. The positioning aiding information transmitting unit transmits positioning aiding information to the positioning terminal through the communication network. The positioning basic information receiving unit receives the positioning basic information transmitted by the positioning terminal through the communication network. The positioning success or failure information receiving unit receives the positioning success or failure information transmitted by the positioning terminal through the communication network. The information provision device side position calculating unit calculates a position of the positioning terminal based on the positioning aiding information and the positioning basic information. The positioning execution go or no-go determining unit determines whether the information provision device side position calculating unit performs position calculation of the positioning terminal or not based on the positioning success or failure information.

According to this configuration, since the positioning terminal transmits the positioning success or failure information to the information provision device, the information provision device can avoid the positioning calculation based on the positioning basic information with which the positioning calculation is impossible.

According to a sixth aspect of the present invention, a positioning method is provided. The method uses a positioning terminal that performs positioning utilizing position information satellites, an information provision device that provides positioning aiding information to the positioning terminal, and a communication network for the positioning terminal to communicate with the information provision device. The method includes: requesting the information provision device to transmit positioning aiding information through the communication network by a positioning aiding information transmission requesting unit of the positioning terminal; receiving the positioning aiding information transmitted by the information provision device through the communication network by a positioning aiding information receiving unit of the positioning terminal; acquiring the position information satellites and obtaining positioning basic information from positioning-related signals transmitted by the position information satellites by a positioning basic information obtaining unit of the positioning terminal; calculating a position of the positioning terminal based on the positioning aiding information and the positioning basic information by a terminal side position calculating unit of the positioning terminal; transmitting the positioning basic information to the information provision device through the communication network by a positioning basic information transmitting unit of the positioning terminal; generating positioning success or failure information indicating whether the terminal side position calculating unit has successfully calculated the position of the positioning terminal or not by a positioning success or failure information generating unit of the positioning terminal; transmitting the positioning success or failure information to the information provision device through the communication network by a positioning success or failure information transmitting unit of the positioning terminal; obtaining the positioning aiding information by a positioning aiding information obtaining unit of the information provision device; transmitting the positioning aiding information to the positioning terminal through the communication network by a positioning aiding information transmitting unit of the information provision device; receiving the positioning basic information transmitted by the positioning terminal through the communication network by a positioning basic information receiving unit of the information provision device; receiving the positioning success or failure information transmitted by the positioning terminal through the communication network by a positioning success or failure information receiving unit of the information provision device; calculating the position of the positioning terminal based on the positioning aiding information and the positioning basic information by an information provision device side position calculating unit of the information provision device; and determining whether the information provision device side position calculating unit performs position calculation of the positioning terminal or not based on the positioning success or failure information by a positioning execution go or no-go determining unit of the information provision device.

According to this configuration, as well as the configuration of the first aspect, the load on the information provision device can be reduced.

According to a seventh aspect of the present invention, a control program for a positioning system having a positioning terminal that performs positioning utilizing position information satellites, an information provision device that provides positioning aiding information to the positioning terminal, and a communication network for the positioning terminal to communicate with the information provision device. The program allows a computer to execute: a positioning aiding information transmission requesting step at which a positioning aiding information transmission requesting unit of the positioning terminal requests the information provision device to transmit positioning aiding information through the communication network; a positioning aiding information receiving step at which a positioning aiding information receiving unit of the positioning terminal receives the positioning aiding information transmitted by the information provision device through the communication network; a positioning basic information obtaining step at which a positioning basic information obtaining unit of the positioning terminal acquires the position information satellites and obtains positioning basic information from positioning-related signals transmitted by the position information satellites; a terminal side position calculating step at which a terminal side position calculating unit of the positioning terminal calculates a position of the positioning terminal based on the positioning aiding information and the positioning basic information; a positioning basic information transmitting step at which a positioning basic information transmitting unit of the positioning terminal transmits the positioning basic information to the information provision device through the communication network; a positioning success or failure information generating step at which a positioning success or failure information generating unit of the positioning terminal generates positioning success or failure information indicating whether the terminal side position calculating unit has successfully calculated the position of the positioning terminal or not; a positioning success or failure information transmitting step at which a positioning success or failure information transmitting unit of the positioning terminal transmits the positioning success or failure information to the information provision device through the communication network; a positioning aiding information obtaining step at which a positioning aiding information obtaining unit of the information provision device obtains the positioning aiding information; a positioning aiding information transmitting step at which a positioning aiding information transmitting unit of the information provision device transmits the positioning aiding information to the positioning terminal through the communication network; a positioning basic information receiving step at which a positioning basic information receiving unit of the information provision device receives the positioning basic information transmitted by the positioning terminal through the communication network; a positioning success or failure information receiving step at which a positioning success or failure information receiving unit of the information provision device receives the positioning success or failure information transmitted by the positioning terminal through the communication network; an information provision device side position calculating step at which an information provision device side position calculating unit of the information provision device calculates the position of the positioning terminal based on the positioning aiding information and the positioning basic information; and a positioning execution go or no-go determining step at which a positioning execution go or no-go determining unit of the information provision device determines whether the information provision device side position calculating unit performs position calculation of the positioning terminal or not based on the positioning success or failure information.

According to this configuration, as well as the configuration of the first aspect, the load on the information provision device can be reduced.

According to a eighth aspect of the present invention, a computer-readable recording medium for recording a control program for a positioning system having a positioning terminal that performs positioning utilizing position information satellites, an information provision device that provides positioning aiding information to the positioning terminal, and a communication network for the positioning terminal to communicate with the information provision device is provided. The program allows a computer to execute: a positioning aiding information transmission requesting step at which a positioning aiding information transmission requesting unit of the positioning terminal requests the information provision device to transmit positioning aiding information through the communication network; a positioning aiding information receiving step at which a positioning aiding information receiving unit of the positioning terminal receives the positioning aiding information transmitted by the information provision device through the communication network; a positioning basic information obtaining step at which a positioning basic information obtaining unit of the positioning terminal acquires the position information satellites and obtains positioning basic information from positioning-related signals transmitted by the position information satellites; a terminal side position calculating step at which a terminal side position calculating unit of the positioning terminal calculates a position of the positioning terminal based on the positioning aiding information and the positioning basic information; a positioning basic information transmitting step at which a positioning basic information transmitting unit of the positioning terminal transmits the positioning basic information to the information provision device through the communication network; a positioning success or failure information generating step at which a positioning success or failure information generating unit of the positioning terminal generates positioning success or failure information indicating whether the terminal side position calculating unit has successfully calculated the position of the positioning terminal or not; a positioning success or failure information transmitting step at which a positioning success or failure information transmitting unit of the positioning terminal transmits the positioning success or failure information to the information provision device through the communication network; a positioning aiding information obtaining step at which a positioning aiding information obtaining unit of the information provision device obtains the positioning aiding information; a positioning aiding information transmitting step at which a positioning aiding information transmitting unit of the information provision device transmits the positioning aiding information to the positioning terminal through the communication network; a positioning basic information receiving step at which a positioning basic information receiving unit of the information provision device receives the positioning basic information transmitted by the positioning terminal through the communication network; a positioning success or failure information receiving step at which a positioning success or failure information receiving unit of the information provision device receives the positioning success or failure information transmitted by the positioning terminal through the communication network; an information provision device side position calculating step at which an information provision device side position calculating unit of the information provision device calculates the position of the positioning terminal based on the positioning aiding information and the positioning basic information; and a positioning execution go or no-go determining step at which a positioning execution go or no-go determining unit of the information provision device determines whether the information provision device side position calculating unit performs position calculation of the positioning terminal or not based on the positioning success or failure information.

According to this configuration, as well as the configuration of the first aspect, the load on the information provision device can be reduced.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4 is a view of a schematic diagram showing contents of positioning basic information obtained by a positioning terminal of the positioning apparatus system shown in FIG. 1;

FIGS. 7A and 7B are views of schematic diagrams showing contents of positioning basic information that the cellular phone in FIG. 1 transmits to the positioning server of FIG. 1;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Since the embodiment as described below is a preferred specific example of the invention, technically preferred various limitations are imposed thereon. However, the scope of the invention is not limited to these modes without particular description that limits the invention in the explanation below.

Figure 1:
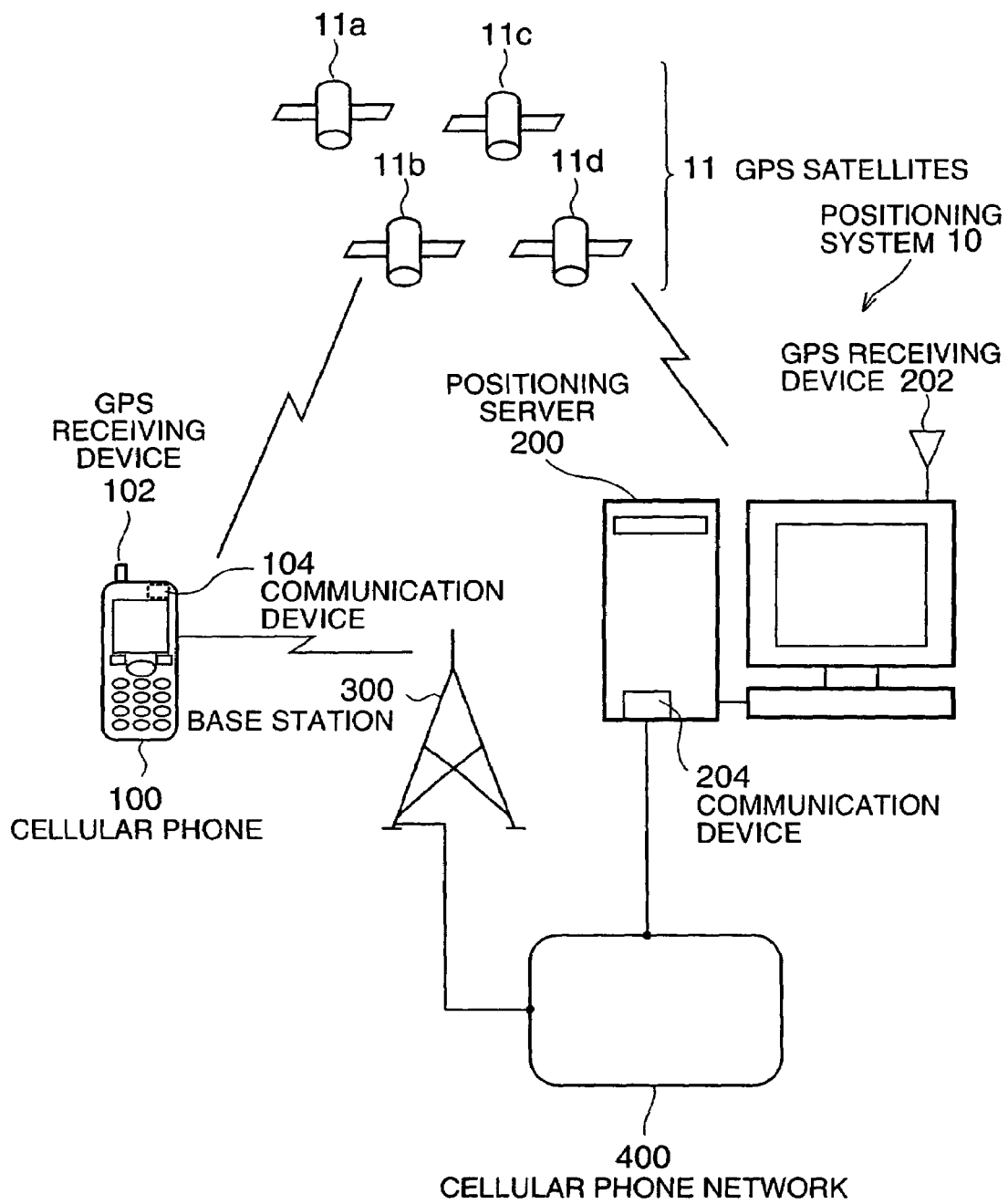
FIG. 1 is a view of a schematic diagram showing a positioning apparatus system according to a first preferred embodiment of the present invention.

FIG. 1 is a view of a schematic diagram showing a positioning system 10 according to a first preferred embodiment of the present invention. A cellular phone 100 is an example of positioning terminal, and has a communication device 104. Further, a positioning server 200 is an example of information provision device, and has a communication device 204. Accordingly, the cellular phone 100 and the positioning server 200 can communicate with each other through a cellular phone network 400 and a base station 300, which are examples of parts of a communication network.

The cellular phone 100 has a GPS receiving device 102 in order to receive position-related signals transmitted from GPS satellites 11a-11d, which are examples of position information satellites and acquire positioning basic information. In FIG. 1, four GPS satellites 11a to 11d are shown, however, at least 24 GPS satellites are actually operated and the cellular phone 100 acquires satellites of the 24 GPS satellites, which can receive position-related signals in the position of the cellular phone 100, and obtains positioning basic information.

The positioning server 200 also has a GPS receiving device 202, and receives the position-related signals transmitted from the GPS satellites 11a-11d and obtains positioning aiding information.

Main Hardware Configuration of Cellular Phone 100 (Positioning Server 200)

Figure 2:
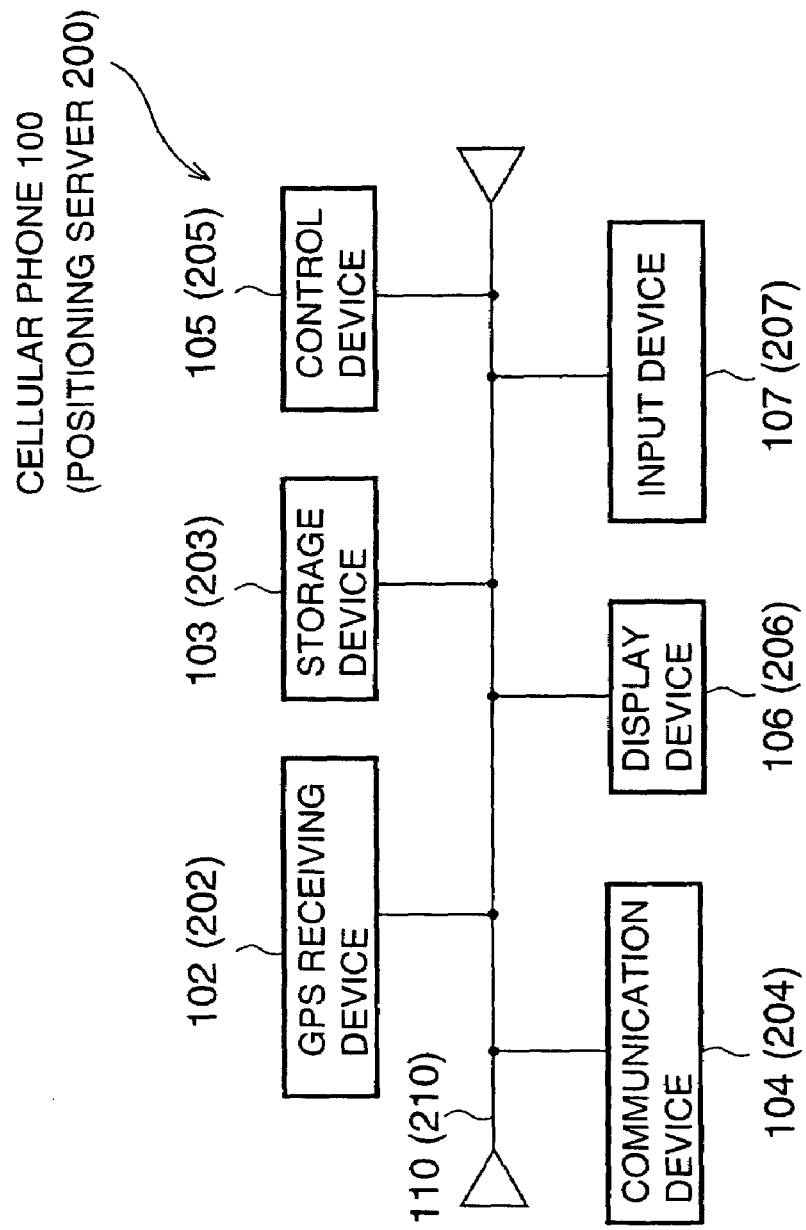
FIG. 2 is a view of a schematic diagram showing a main hardware configuration of the cellular phone and a positioning server of the positioning apparatus system shown in FIG. 1.

FIG. 2 is a view of a schematic diagram showing a main hardware configuration of the cellular phone 100 (positioning server 200) shown in FIG. 1. As shown in FIG. 2, the cellular phone 100 (positioning server 200) has a computer. In other words, the computer includes a bus 110 (210) and a control device 105 (205) such as a CPU, for example, that is connected to the bus 110 (210).

Further, a storage device 103 (203) including a RAM (Random Access Memory) or ROM (Read Only Memory) is also connected to the bus 110 (210).

Furthermore, the GPS receiving device 102 (202), the communication device 104 (204), a display device 106 (206), and an input device 107 (207) are also connected to the bus 110 (210). In other words, the bus 110 (210) is an internal bus having a function of connecting all devices and address and data paths. The control device 105 (205) processes predetermined programs and controls the storage device 103 (203) connected to the bus 110 (210) or the like. The storage device 103 (203) stores various kinds of programs, various kinds of information, etc.

Main Software Configuration of Cellular Phone 100

Figure 3:
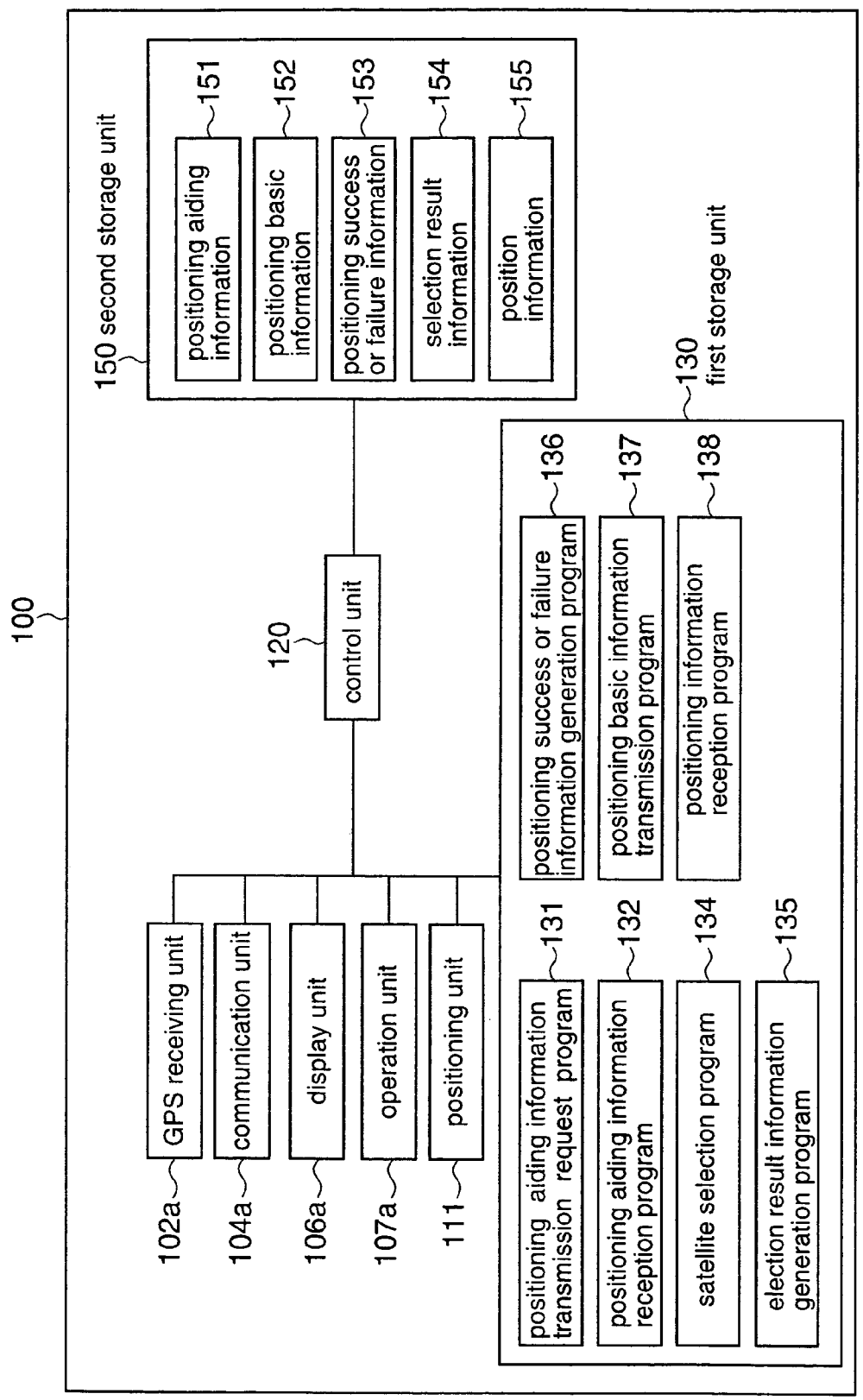
FIG. 3 is a view of a schematic diagram showing a main software configuration of the cellular phone shown in FIG. 1.

FIG. 3 is a view of a schematic diagram showing a main software configuration of the cellular phone 100 shown in FIG. 1. As shown in FIG. 3, the cellular phone 100 has a control unit 120 to control the entire cellular phone 100. Further, the cellular phone 100 has a GPS receiving unit 102a, a communication unit 104a, a display unit 106a, and an operation unit 107a to manage the GPS receiving device 102, the communication device 104, the display device 106, and the input device 107 shown in FIG. 2. The aforementioned parts of the cellular phone 100 are connected to the control unit 120. Accordingly, the GPS receiving device 102 etc. Are arranged so as to be controlled by the control unit 120.

A positioning unit 111 of the cellular phone 100 performs acquisition of the GPS satellites 11a etc. Based on the positioning aiding information, analyzes the position-related signals, and obtains the positioning basic information. In other words, the positioning unit 111 may be an example of a positioning basic information obtaining unit.

Part of the positioning basic information obtained as a result of acquisition of the GPS satellites 11a etc. And analysis of the position-related signals by the positioning unit 111 is shown in FIG. 4. "Satellite number" in FIG. 4 is a number to identify independent satellites among 26 GPS satellites and included in the position-related signals. "Elevation angle" is an angle formed by a straight line connecting an observation point and the GPS satellite and a horizon. The elevation angle is calculated based on the positioning aiding information transmitted from the positioning server and an initial position of the cellular phone 100.

As seen in FIG. 3, the cellular phone 100 has a first storage unit 130 to store various kinds of programs and a second storage unit 150 to store information that the programs stored in the first storage unit 130 have obtained or generated.

In the first storage unit 130, a positioning aiding information transmission request program 131, a positioning aiding information reception program 132, a satellite selection program 134, a selection result information generation program 135, a positioning success or failure information generation program 136, a positioning basic information transmission program 137, and a positioning information reception program 138 are stored. Further, in the second storage unit 150, positioning aiding information 151, positioning basic information 152, positioning success or failure information 153, selection result information 154, and position information 155 are stored.

In order to start performing positioning, the positioning aiding information transmission request program 131 requests the positioning server 200 to transmit positioning aiding information through the base station 300 and the cellular phone network 400. In other words, the positioning aiding information transmission request program 131 and the control unit 120 are examples of parts of a positioning aiding information transmission requesting unit.

The positioning aiding information reception program 132 receives the positioning aiding information transmitted from the positioning server 200 and stores it as the positioning aiding information 151 in the second storage unit 150. In other words, the positioning aiding information reception program 132 and the control unit 120 are examples of parts of a positioning aiding information receiving unit. The positioning aiding information 151 specifically includes ephemera, almanac, GPS time, etc. And is information required for the cellular phone 100 to acquire the GPS satellites 11.

If it is possible that the positioning unit 111 acquires the GPS satellites in number exceeding the smallest number of satellites (three or four) required for position calculations, the satellite selection program 134 selects GPS satellites actually used for position calculation among those GPS satellites. In other words, the satellite selection program 134 and the control unit 120 are examples of parts of a terminal side satellite selecting unit.

Figure 5A:
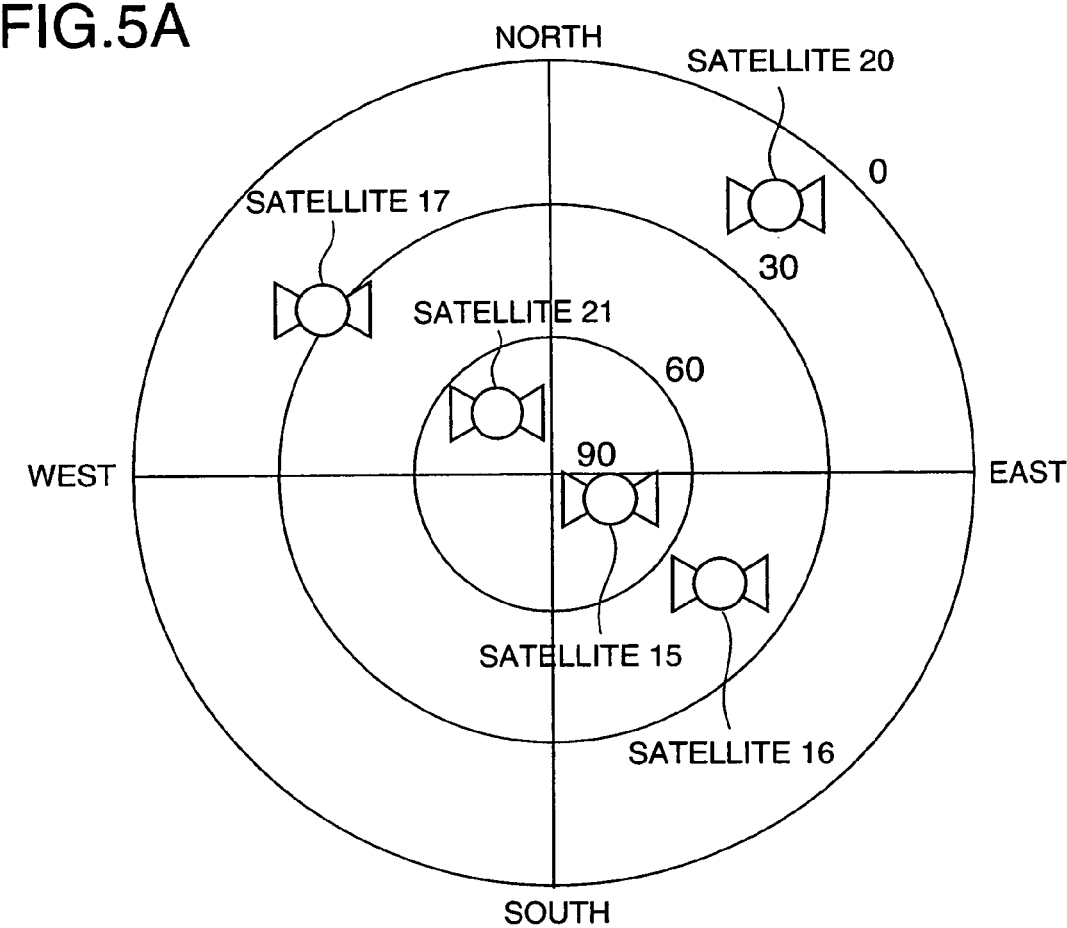
FIGS. 5A and 5B are views of schematic diagrams showing the relationship between the arrangement of GPS satellites and PDOP of the positioning apparatus system.
Figure 5B:
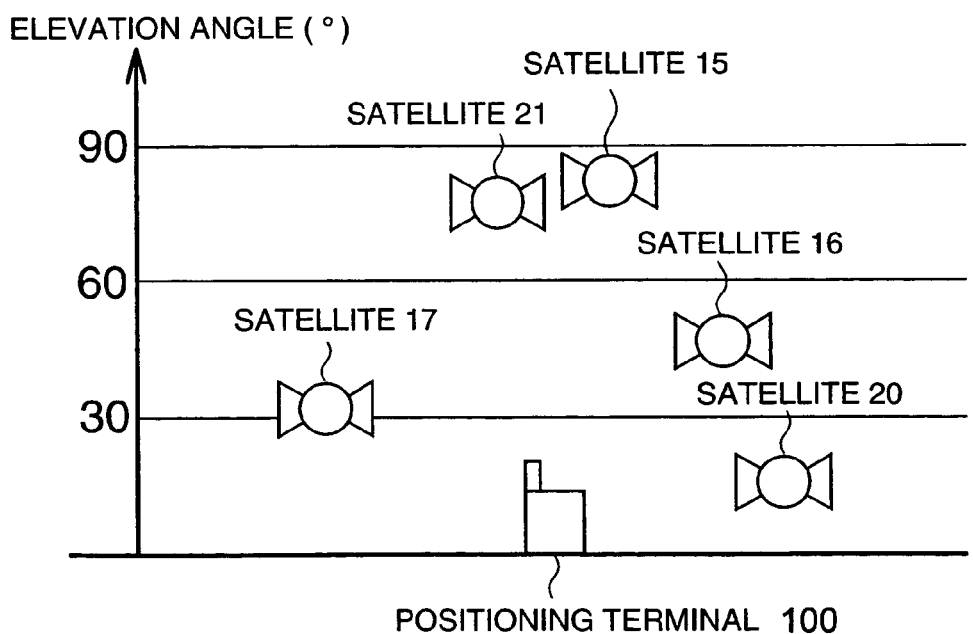

As reference for the selection of GPS satellites, elevation angles, signal intensity, or the like may be used. In the example in FIG. 4, when four GPS satellites are selected in descending order of elevation angles, four GPS satellites of satellites numbers 15, 16, 17, and 21 are selected. FIG. 5A shows the arrangement of these GPS satellites in the sky. Further, FIG. 5B schematically shows how these GPS satellites are seen from the observation point. To select GPS satellites at larger elevation angles can avoid use of reflected wave for positioning in the case where a multipath occurs and is essentially preferable.

Figure 6A:
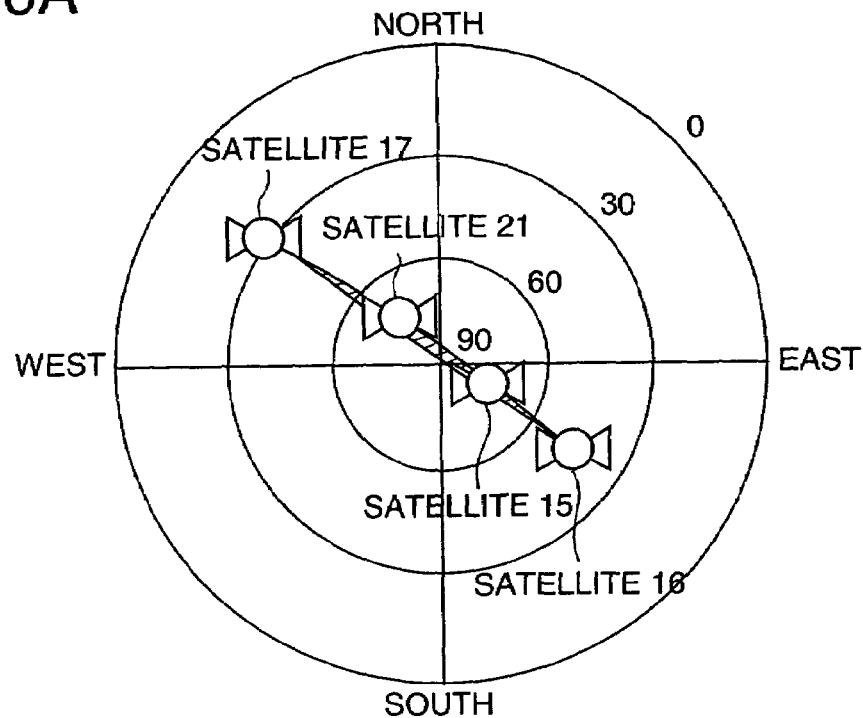
FIGS. 6A and 6B are views of schematic diagrams showing the relationship between the arrangement of the GPS satellites and PDOP.

However, the satellite 15, the satellite 16, the satellite 17, and the satellite 21 are located nearly along one straight line in FIG. 5A. This unit that the area of a quadrangle formed by the four satellites (the area of the hatched part in FIG. 6A) is small and the PDOP is extremely large. In such a case where the PDOP is larger, the position calculations sometimes do not converged and result in failure. Further, even if a certain measure of success in calculation is achieved, the position precision of the cellular phone 100 as a result of the calculation becomes extremely low. In other words, in the case where the satellites are selected with reference only to elevation angles, the selection is not necessarily preferable. This situation is the same in the case in which the selection is performed with reference to the signal intensity of position-related signals received from the respective GPS satellites.

Figure 6B:
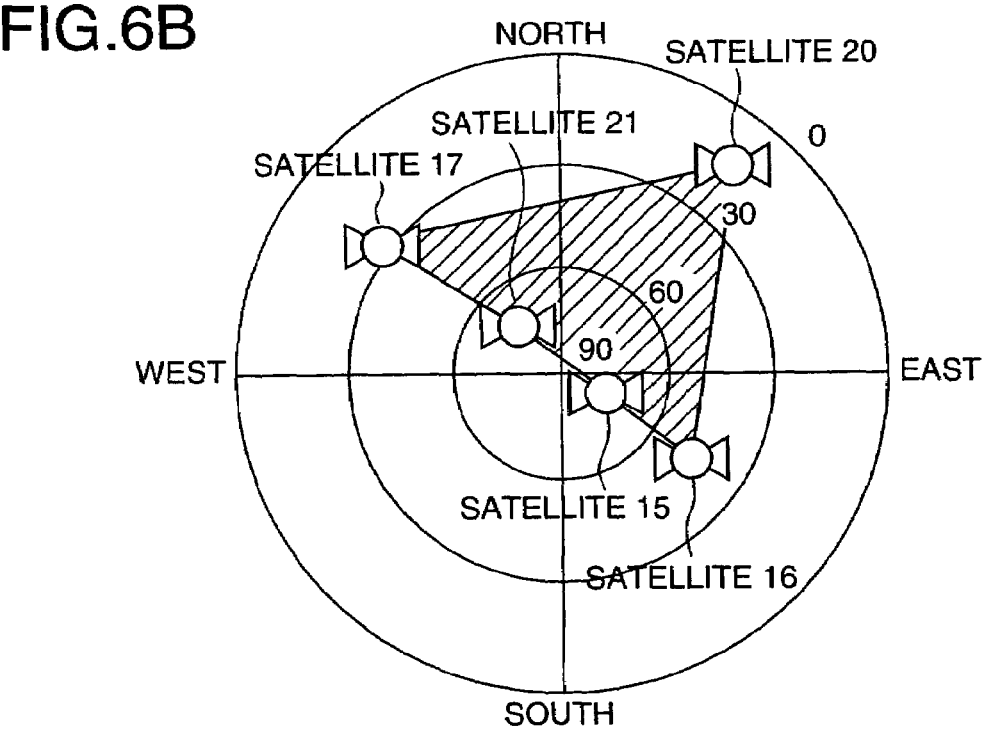

Since the PDOP can be calculated by ephemera included in positioning aiding data, the satellite selection program 134 of the embodiment selects satellites to be used for positioning so that the PDOP may become smaller. For example, it selects the satellite 20 located apart from the straight line connecting the satellite 16 and the satellite 17 as seen in FIG. 6B. Such a selection can make PDOP smaller (the area hatched in the same drawing becomes larger). Thus, by selecting GPS satellites used for positioning calculation with reference to the PDOP, the probability of selecting GPS satellites to be successful in positioning can be increased compared to the case of selection with reference to elevation angles or signal intensity.

With respect to the acquired GPS satellites, the satellite selection program 134 generates "YES" if it is used for position calculation and "NO" if it is not used for position calculation as the selection result information 154 and stores the information in the second storage unit 150. In other words, the satellite selection program 134 and the control unit 120 are also examples of parts of a selection result information generating unit.

Referring again to FIG. 3, the positioning success or failure information generation program 136 generates positioning success or failure information indicating whether the positioning calculation performed by the positioning unit 111 based on the positioning basic information obtained from the successfully acquired GPS satellites has been successful or not. In the case where the positioning unit 111 has successfully performed position calculation using the positioning basic information obtained from the GPS satellites selected by the satellite selection program 134, the positioning success or failure information generation program 136 generates "YES" as the positioning success or failure information 153 and stores it in the second storage unit 150. In the case where the number of successfully acquired GPS satellites is less than three, or, in the case where four or more satellites can be acquired but the positioning unit 111 has failed in position calculation for the reason that the arrangement of the satellites is not good or the like, the program generates "NO" as the positioning success or failure information 153 and stores it in the second storage unit 150.

In other words, the positioning success or failure information generation program 136 and the control unit 120 are examples of parts of a positioning success or failure information generating unit.

The positioning basic information transmission program 137 transmits the positioning basic information 152, the positioning success or failure information 153, and the selection result information 154 to the positioning server 200. In other words, the positioning basic information transmission program 137 and the control unit 120 are examples of parts of a positioning basic information transmitting unit, positioning success or failure information transmitting unit, and selection result information transmitting unit.

FIG. 7A is a view of a schematic diagram showing information that the positioning basic information transmission program 137 transmits to the positioning server 200 when the positioning unit 111 has been successful in position calculation. The positioning success or failure information 153 is "YES" because the positioning has been successful. The positioning basic information 152 includes an index 152a, a satellite number 152b, and a code phase 152c. With respect to each satellite, the selection result information 154 is "YES" if it has been used for positioning calculation and "NO" if it has not been used for positioning calculation.

FIG. 7B is a view of a schematic diagram showing information that the positioning basic information transmission program 137 transmits to the positioning server 200 when the positioning unit 111 has failed in position calculation. The structure of the information is the same as that in the case where it has been successful in position calculation, however, the selection result information 154 becomes "NO". Further, with respect to the satellite indicated as a satellite possible to be acquired in the positioning aiding information but actually has not been acquired, the code phase 152c is in blank (NULL).

By the way, the reason the positioning basic information etc. Are transmitted to the positioning server 200 even if the cellular phone 100 has been successful in positioning calculation is to respond to the request of the existing positioning protocol. Further, the position calculation is also performed in the server for a third party to utilize the calculation results.

The positioning information reception program 138 receives position information transmitted from the positioning server 200. The reason the position information is received from the positioning server 200 even if the cellular phone 100 has been successful in positioning calculation is to respond to the request of the existing positioning protocol. Further, in the case where the positioning calculation has failed in the cellular phone 100, for example, the position of the base station 300 received as the position information is used as an initial position of the cellular phone 100 at the next positioning time.

Accordingly, the positioning information reception program 138 stores the received position information as the position information 155 in the second storage unit 150.

Main Software Configuration of Positioning Server 200

Figure 8:
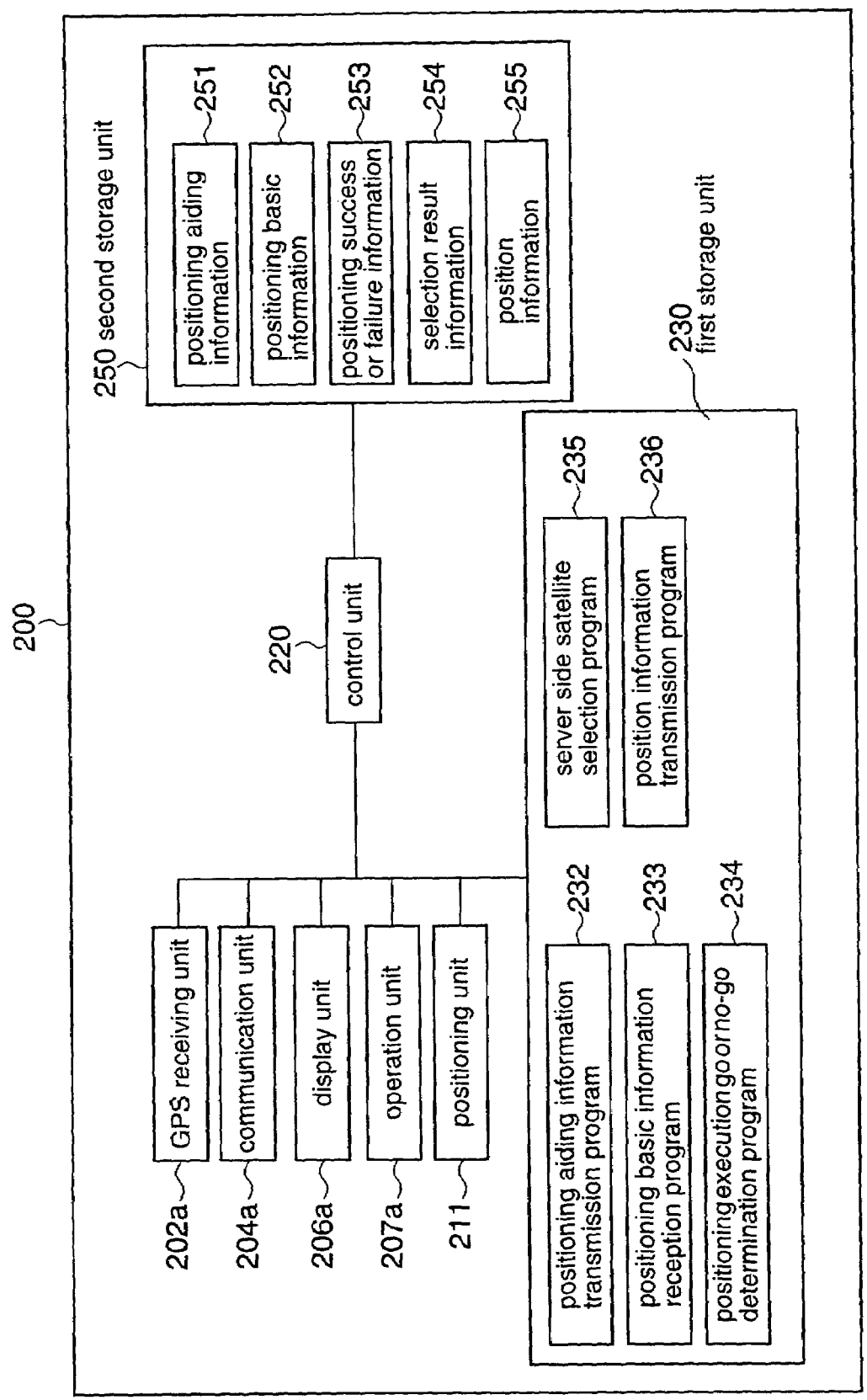
FIG. 8 is a view of a schematic diagram showing a main software configuration of the positioning server of FIG. 1.

FIG. 8 is a view of a schematic diagram showing a main software configuration of the positioning server 200 in FIG. 1. As shown in FIG. 8, the positioning server 200 has a control unit 220 to control the entire positioning server 200.

Further, the positioning server 200 has a GPS receiving unit 202a, a communication unit 204a, a display unit 206a, and an operation unit 207a to manage the GPS receiving device 202, the communication device 204, the display device 206, and the input device 207 shown in FIG. 2. The aforementioned components are connected to the control unit 220. Accordingly, the GPS receiving device 202 and other mentioned parts are arranged so as to be controlled by the control unit 220.

A positioning unit 211 analyzes position-related signals acquired by the GPS receiving unit 202a from the GPS satellites and obtains positioning aiding information. In other words, the positioning unit 211 is an example of a positioning aiding information obtaining unit. By the way, unlike the example shown in the present embodiment, the positioning server 200 may be arranged without the GPS receiving unit 202a, to obtain positioning basic information from another server in communication through a network.

The positioning server 200 has a first storage unit 230 to store various kinds of programs and a second storage unit 250 to store information that the programs stored in the first storage unit 230 have obtained or generated.

In the first storage unit 230, a positioning aiding information transmission program 232, a positioning basic information reception program 233, a positioning execution go or no-go determination program 234, a server side satellite selection program 235, and a position information transmission program 236 are stored.

In the second storage unit 250, positioning aiding information 251, positioning basic information 252, positioning success or failure information 253, selection result information 254, and position information 255 are stored.

The positioning aiding information transmission program 232 transmits the positioning aiding information 251 stored in the second storage unit 250 to the cellular phone 100 in response to a transmission request from the cellular phone 100. In other words, the positioning aiding information transmission program 232 and the control unit 220 are examples of parts of a positioning basic information transmitting unit.

The positioning basic information reception program 233 receives information transmitted by the positioning basic information transmission program 137 of the cellular phone 100. Since the information transmitted by the positioning basic information transmission program 137 includes the positioning basic information 152, the positioning success or failure information 153, and the selection result information 154, the positioning basic information reception program 233 and the control unit 220 are examples of parts of a positioning basic information receiving unit, positioning success or failure information receiving unit, and selection result information receiving unit.

The positioning basic information reception program 233 respectively stores the received information as the positioning basic information 252, the positioning success or failure information 253, and the selection result information 254 in the second storage unit 250.

The positioning execution go or no-go determination program 234 determines that the position calculation can be performed if the positioning success or failure information 253 is "YES" and instructs the positioning unit 211 to start position calculation, and, if the positioning success or failure information 253 is "NO," instructs the unit not to perform position calculation. In other words, the positioning execution go or no-go determination program 234 and the control unit 220 are examples of parts of positioning execution go or no-go determining unit.

Since the positioning success or failure information 253 is information based on the results from the actual position calculation by the cellular phone 100, when the positioning success or failure information 253 is "NO," it is clear that the position calculation by the positioning unit 211 will fail. Therefore, the positioning execution go or no-go determination program 234 instructs the start of position calculation only when the positioning success or failure information 253 is "YES" as shown in the present embodiment, and thereby, wasteful position calculations can be avoided and the load on the server 200 can be reduced.

The server side satellite selection program 235 selects GPS satellites with selection results of "YES" in the cellular phone 100 in the selection result information 254 as GPS satellites to be used for position calculation. In other words, the server side satellite selection program 235 is an example of a server side satellite selecting unit.

The positioning unit 211 calculates the position of the cellular phone 100 using the positioning basic information with respect to the GPS satellites selected by the server side satellite selection program 235. In other words, the positioning unit 211 is an example of an information provision device side position calculating unit. The positioning unit 211 stores the calculated position of the cellular phone 100 as position information 255 in the second storage unit 250.

Since the satellite selection based on the PDOP or the like becomes unnecessary to be performed again in the server 200 because the server side satellite selection program 235 selects the same satellites as those used in the position calculation in the cellular phone 100, the load on the positioning server 200 can be reduced.

In the case in which the positioning unit 211 has performed the position calculation, the position information transmission program 236 transmits the position information 255 to the cellular phone 100. In the case in which the positioning unit 211 has not performed the position calculation, the program transmits the position of the base station 300 as position information to the cellular phone 100.

The cellular phone 100 and the positioning server 200 are configured as above. Next, an operation example thereof will be described.

Main Operation Example of Positioning System 10

Figure 9:
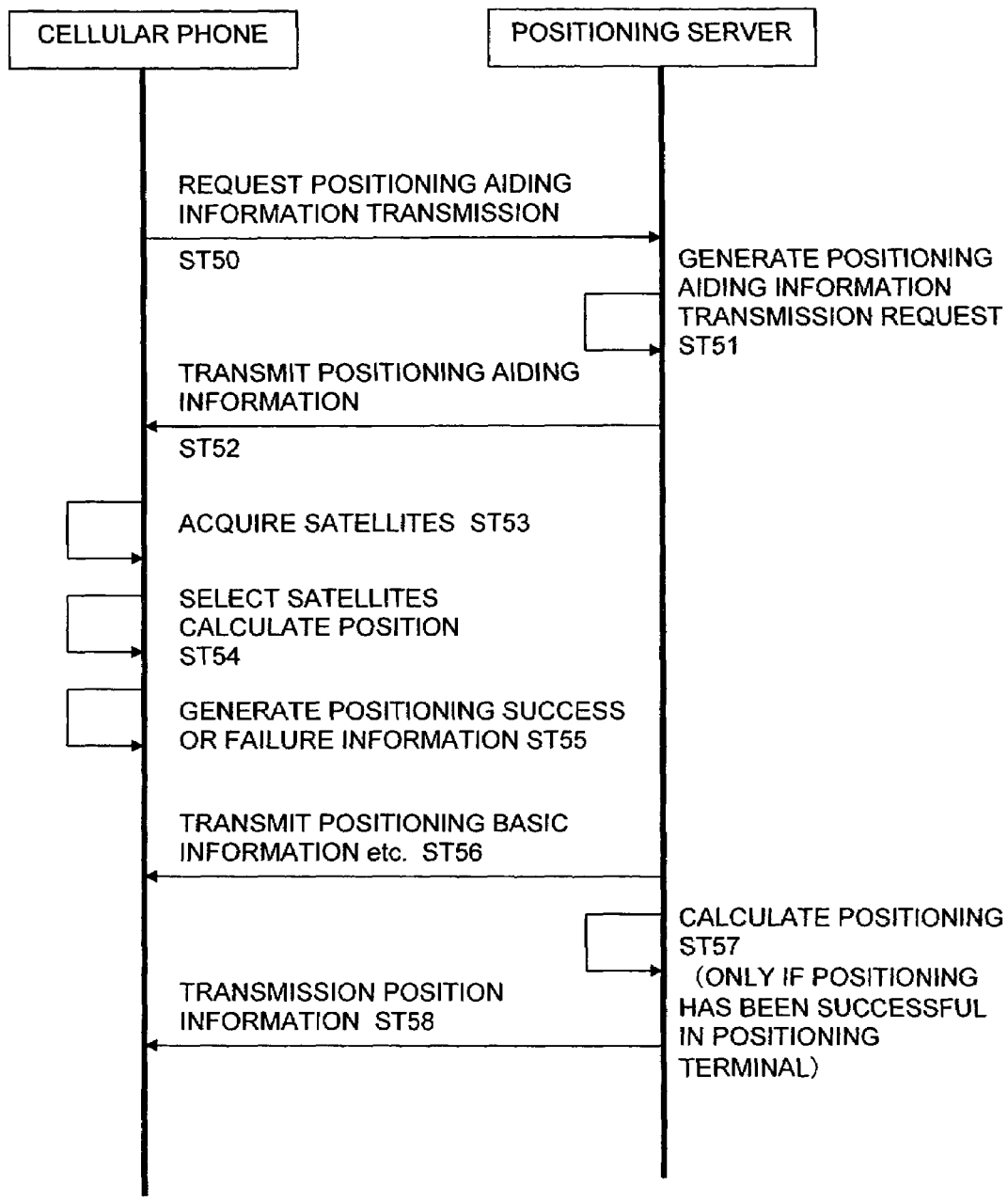
FIG. 9 is a view of a schematic sequence diagram showing a main operation example of the positioning system shown in FIG. 1.

FIG. 9 is a view of a schematic sequence diagram showing a main operation example of the positioning system 10 of the present embodiment.

The cellular phone 100 makes a positioning aiding information transmission request to the positioning server 200 (STAB). The positioning server 200 that has received the positioning aiding information transmission request generates positioning aiding information (ST51) and transmits it to the cellular phone 100 (ST52).

The cellular phone 100 that has received the positioning aiding information acquires GPS satellites based on the positioning aiding information and generates positioning basic information (ST53).

The cellular phone 100 selects satellites to be used for positioning among the successfully acquired GPS satellites and performs position calculations (ST54). If the position calculations are successful, the phone generates "YES" and, if the position calculations have failed, generates "NO" as positioning success or failure information (STAG).

Then, the cellular phone 100 transmits the positioning basic information, the selection result information, and the positioning success or failure information to the positioning server 200 (ST56).

The positioning server 200 receives the positioning basic information etc. If the positioning success or failure information is "YES," the positioning server 200 performs position calculations for the cellular phone 100, and stores the calculation results as position information 255 in the second storage unit 250. If the positioning success or failure information is "NO," the server 200 stores the position of the base station 300 in the position information 255 without performing position calculations. (ST58).

The positioning server 200 then transmits the position information 255 to the cellular phone 100 (STAG).

Main Operation Example of Cellular Phone 100

Figure 10:
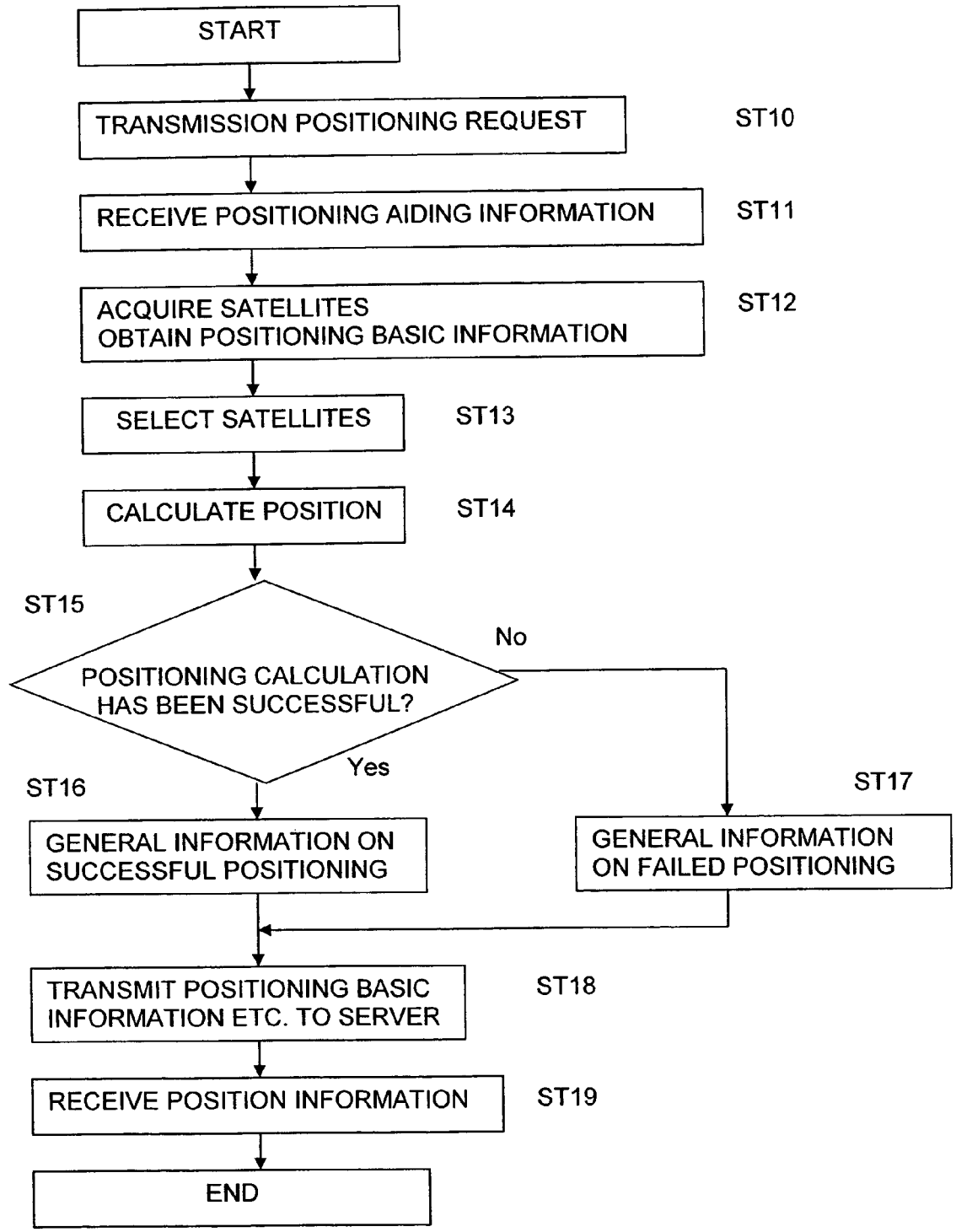
FIG. 10 is a view of a schematic flowchart showing a main operation example of the cellular phone shown in FIG. 1.

FIG. 10 is a view of a schematic flowchart showing a main operation example of the cellular phone 100 of the present embodiment.

The cellular phone 100 requests the positioning server 200 to transmit positioning aiding information (ST10, an example of a positioning aiding information transmission requesting step).

Then, the cellular phone 100 receives the positioning aiding information transmitted by the positioning server 200 in response to the transmission request performed at ST10 (ST11, an example of a positioning aiding information receiving step), and stores it in the positioning aiding information 151 in the second storage unit 150.

The cellular phone 100 acquires GPS satellites based on the positioning aiding information 151 and obtains positioning basic information (ST12, an example of a positioning basic information obtaining step).

The cellular phone 100 selects a combination of GPS satellites for which the PDOP is minimized as GPS satellites used for position calculation (ST13), and stores it as the selection result information 154 in the second storage unit 150.

The cellular phone 100 attempts to calculate the position of the cellular phone 100 using the positioning basic information of the GPS satellites selected at ST13 (ST14, an example of a terminal side position calculating step). If the position calculation is successful, the phone generates "YES" as positioning success or failure information 153, and, if the position calculation fails, generates "NO" as positioning success or failure information 153 (ST16 and ST17, an example of positioning success or failure information generating step), and stores it in the second storage unit 150.

The cellular phone 100 transmits the positioning aiding information 151, the positioning success or failure information 153, and the selection result information 154 to the positioning server 200 (ST18, an example of a positioning basic information transmitting step). Then, the cellular phone 100 receives the position information transmitted from the positioning server 200 (ST19).

Main Operation Example of Positioning Server 200

Figure 11:
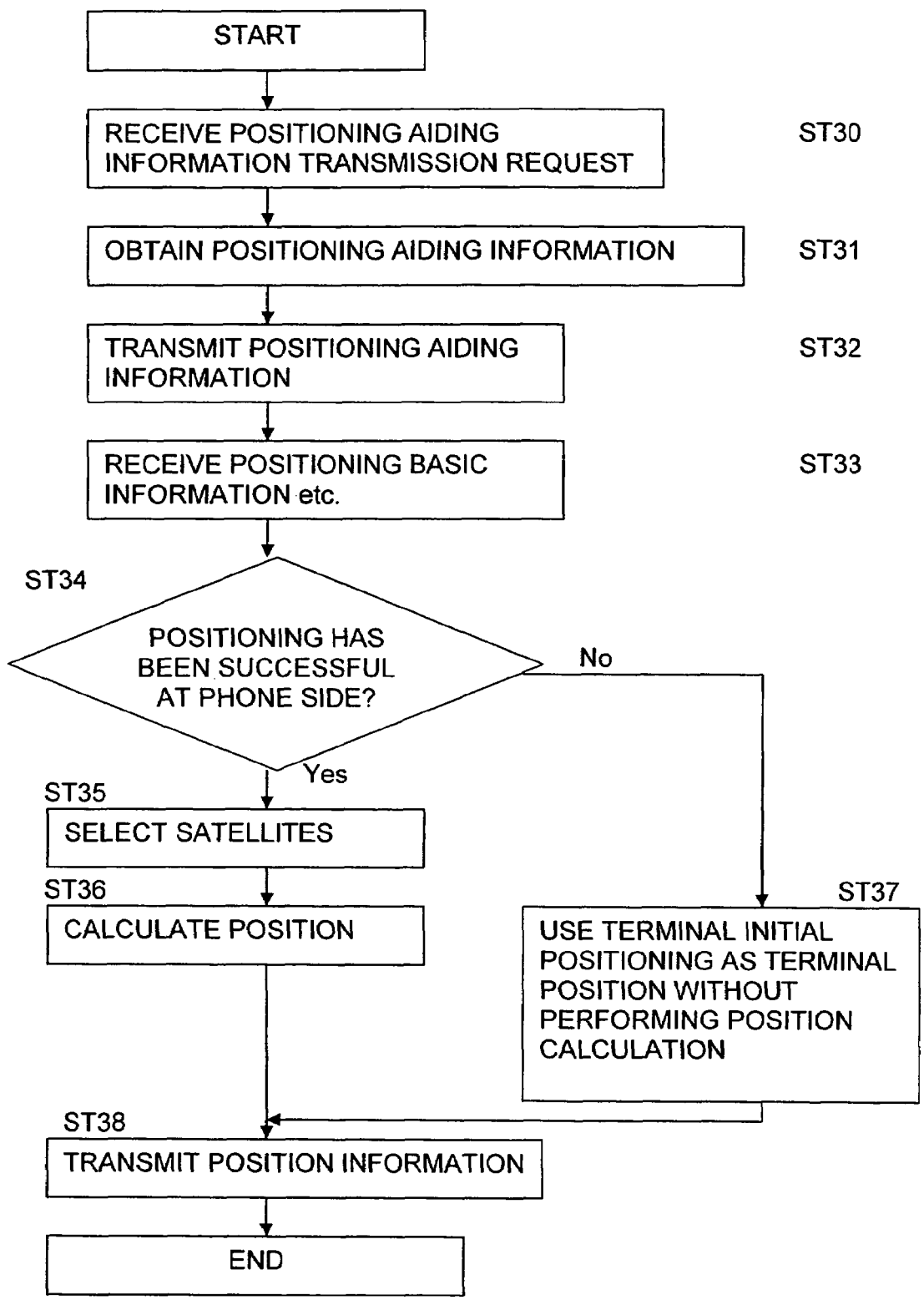
FIG. 11 is a view of a schematic flowchart showing a main operation example of the positioning server shown in FIG. 1.

FIG. 11 is a view of a schematic flowchart showing a main operation example of the positioning server 200 of the present embodiment.

When the positioning server 200 receives the positioning basic information transmission request transmitted by the cellular phone 100 (ST30), it obtains positioning aiding information in order to transmit the positioning aiding information in response to the request (ST31, an example of a positioning aiding information obtaining step). The positioning server 200 transmits the obtained positioning aiding information to the cellular phone 100 (ST32, an example of a positioning aiding information transmitting step).

The positioning server 200 receives the positioning aiding information 151, the positioning success or failure information 153, and the selection result information 154 transmitted from the cellular phone 100 (ST33, an example of a positioning basic information receiving step). All of this information is respectively stored in the second storage unit 250 of the positioning server 200 as the positioning basic information 252, the positioning success or failure information 253, and the selection result information 254.

The positioning server 200 determines whether the position calculation has been successful or not in the cellular phone 100 by referring to the positioning success or failure information (ST34, an example of a positioning execution go or no-go determining step). If the position calculation has been successful in the cellular phone 100, that is, if the positioning success or failure information 253 is "YES," the server refers to the selection result information 254, selects the same set of satellites as that the cellular phone 100 has used for position calculation (ST35), and calculates the position of the terminal 100 (ST36, an example of an information provision device side positioning step). If the position calculation has failed in the cellular phone 100, that is, the positioning success or failure information 253 is "NO," the server stores the position of the base station 300 in the position information 255 without performing position calculations (ST37).

The positioning server 200 transmits the position information 255 to the cellular phone 100 (ST38).

As described above, according to the positioning system 10 of the embodiment, the positioning server 200 can refer to the positioning success or failure information transmitted from the cellular phone 100 and, if the position calculation is expected to fail, the position calculations can be omitted. Further, when the positioning server 200 performs position calculations, since the GPS satellites used for the position calculations can be selected by referring to selection result information transmitted from the cellular phone 100, the amount of calculations for satellite selection is reduced. In other words, the cellular phone 100 generates the positioning success or failure information and the selection result information and transmits them to the positioning server 200, and thereby, the load on the positioning server 200 is reduced. Regarding program and computer readable recording medium etc.

A positioning program for allowing a computer to execute the positioning aiding information transmission requesting step, the positioning aiding information receiving step, the positioning basic information obtaining step, the terminal side position calculating step, the positioning basic information transmitting step, the positioning success or failure information transmitting step, the positioning aiding information obtaining step, the positioning aiding information transmitting step, the positioning basic information receiving step, the information provision device side position calculating step, and the positioning execution go or no-go determining step, etc. in the above described operation example can be realized.

Further, a computer readable recording medium in which such positioning program etc. Are recorded can be realized.

A program storage medium used for installing these positioning programs in a computer and enabling them to be executed by the computer can be realized not only by package media such as a flexible disk as a floppy disk (registered trademark), CD-ROM (Compact Disc Read Only Memory), CD-R (Compact Disc-Recordable), CD-RW (Compact Disc-Rewriterble), DVD (Digital Versatile Disc), for example, but also by a semiconductor memory, magnetic disk, magneto-optical disk, or the like in which programs are temporarily or permanently stored.

The invention is not limited to the above described respective embodiments. Furthermore, the above described respective embodiments may be combined with one another.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A positioning system comprising:

a positioning terminal being configured to perform positioning using position information satellites;

an information provision device being configured to provide positioning aiding information to said positioning terminal; and a communication network being configured to allow said positioning terminal to communicate with said information provision device, said positioning terminal having, a positioning aiding information transmission requesting unit being configured to request said information provision device transmit positioning aiding information through said communication network, a positioning aiding information receiving unit being configured to receive said positioning aiding information transmitted by said information provision device through said communication network, a positioning basic information obtaining unit being configured to acquire said position information satellites and to obtain said positioning basic information from positioning-related signals transmitted by the position information satellites, a terminal side position calculating unit being configured to calculate a position of the positioning terminal based on said positioning aiding information and said positioning basic information, a positioning basic information transmitting unit being configured to transmit said positioning basic information to the information provision device through said communication network, a positioning success or failure information generating unit being configured to generate positioning success or failure information indicating whether said terminal side position calculating unit has successfully calculated the position of the positioning terminal or not, and a positioning success or failure information transmitting unit being configured to transmit said positioning success or failure information to the information provision device through the communication network, and said information provision device having, a positioning aiding information obtaining unit being configured to obtain said positioning aiding information, a positioning aiding information transmitting unit being configured to transmit said positioning aiding information to the positioning terminal through said communication network, a positioning basic information receiving unit being configured to receive positioning basic information transmitted by said positioning terminal through said communication network, a positioning success or failure information receiving unit being configured to receive said positioning success or failure information transmitted by said positioning terminal through said communication network, an information provision device side position calculating unit being configured to calculate the position of said positioning terminal based on said positioning aiding information and the positioning basic information, and a positioning execution go or no-go determining unit being configured to determine whether said information provision device side position calculating unit performs position calculations for said positioning terminal based on said positioning success or failure information or not.

2. The positioning system according to claim 1, wherein said positioning terminal includes, a terminal side satellite selecting unit that selects said position information satellites used by said terminal side position calculating unit for position calculation of said positioning terminal from said position information satellites acquired by said positioning basic information obtaining unit, a selection result information generating unit that generates selection result information indicating said position information satellites selected by said terminal side satellite selecting unit, and a selection result information transmitting unit that transmits said selection result information to said information provision device through said communication network, and the information provision device has, a selection result information receiving unit that receives said selection result information transmitted by said positioning terminal through said communication network, and an information provision device side satellite selecting unit that selects said position information satellites used by said information provision device side position calculating unit for position calculations of said positioning terminal based on said selection result information.

3. The positioning system according to claim 2, wherein said terminal side satellite selecting unit of said positioning terminal calculates PDOP based on an arrangement of said position information satellites acquired by said positioning basic information obtaining unit and selects said position information satellites used by said terminal side position calculating unit for position calculation of said positioning terminal to minimize the PDOP.

4. A positioning terminal being configured to acquire positioning aiding information from an information provision device through a communication network and to perform positioning utilizing position information satellites, the terminal comprising:

a positioning aiding information transmission requesting unit being configured to request the information provision device to transmit positioning aiding information through the communication network;

a positioning aiding information receiving unit being configured to receive the positioning aiding information transmitted by the information provision device through the communication network;

a positioning basic information obtaining unit being configured to acquire the position information satellites and obtains positioning basic information from positioning-related signals transmitted by the position information satellites;

a terminal side position calculating unit being configured to calculate a position of the positioning terminal based on the positioning aiding information and the positioning basic information;

a positioning basic information transmitting unit being configured to transmit the positioning basic information to the information provision device through the communication network;

a positioning success or failure information generating unit being configured to generate positioning success or failure information indicating whether said terminal side position calculating unit has successfully calculated the position of the positioning terminal or not; and a positioning success or failure information transmitting unit being configured to transmit the positioning success or failure information to the information provision device through the communication network.

5. An information provision device being configured to provide positioning aiding information to a positioning terminal to perform positioning utilizing position information satellites through a communication network, the device comprising:

a positioning aiding information obtaining unit being configured to obtain the positioning aiding information;

a positioning aiding information transmitting unit being configured to transmit the positioning aiding information to the positioning terminal through the communication network;

a positioning basic information receiving unit being configured to receive the positioning basic information transmitted by the positioning terminal through the communication network;

a positioning success or failure information receiving unit being configured to receive the positioning success or failure information transmitted by the positioning terminal through the communication network;

an information provision device side position calculating unit being configured to calculate a position of the positioning terminal based on the positioning aiding information and the positioning basic information; and a positioning execution go or no-go determining unit being configured to determine whether the information provision device side position calculating unit performs position calculation of the positioning terminal based on the positioning success or failure information or not.

6. A positioning method comprising:

using a positioning terminal to perform positioning utilizing position information satellites, an information provision device to provide positioning aiding information to said positioning terminal, and a communication network for said positioning terminal to communicate with said information provision device;

requesting said information provision device to transmit positioning aiding information through said communication network by a positioning aiding information transmission requesting unit of said positioning terminal;

receiving said positioning aiding information transmitted by said information provision device through said communication network by a positioning aiding information receiving unit of said positioning terminal;

acquiring said position information satellites and obtaining positioning basic information from positioning-related signals transmitted by said position information satellites by a positioning basic information obtaining unit of said positioning terminal;

calculating a position of said positioning terminal based on said positioning aiding information and said positioning basic information by a terminal side position calculating unit of said positioning terminal;

transmitting said positioning basic information to said information provision device through said communication network by a positioning basic information transmitting unit of said positioning terminal;

generating positioning success or failure information indicating whether said terminal side position calculating unit has successfully calculated said position of said positioning terminal or not by a positioning success or failure information generating unit of said positioning terminal;

transmitting said positioning success or failure information to said information provision device through said communication network by a positioning success or failure information transmitting unit of said positioning terminal;

obtaining said positioning aiding information by a positioning aiding information obtaining unit of said information provision device;

transmitting said positioning aiding information to said positioning terminal through said communication network by a positioning aiding information transmitting unit of said information provision device;

receiving said positioning basic information transmitted by said positioning terminal through said communication network by a positioning basic information receiving unit of said information provision device;

receiving said positioning success or failure information transmitted by said positioning terminal through said communication network by a positioning success or failure information receiving unit of said information provision device;

calculating said position of said positioning terminal based on said positioning aiding information and said positioning basic information by an information provision device side position calculating unit of said information provision device; and determining whether said information provision device side position calculating unit performs position calculation of said positioning terminal based on said positioning success or failure information or not by a positioning execution go or no-go determining unit of said information provision device.

7. A control program for a positioning system having a positioning terminal being configured to perform positioning utilizing position information satellites, an information provision device being configured to provide positioning aiding information to the positioning terminal, and a communication network for the positioning terminal to communicate with the information provision device, the program comprising:

code for requesting a positioning aiding information transmission requesting unit of the positioning terminal to request the information provision device to transmit positioning aiding information through the communication network;

code for requesting a positioning aiding information receiving unit of the positioning terminal to receive the positioning aiding information transmitted by the information provision device through the communication network;

code for requesting a positioning basic information obtaining unit of the positioning terminal to acquires the position information satellites and to obtain positioning basic information from positioning-related signals transmitted by the position information satellites;

code for requesting a terminal side position calculating unit of the positioning terminal to calculate a position of the positioning terminal based on the positioning aiding information and the positioning basic information;

code for requesting a positioning basic information transmitting unit of the positioning terminal to transmit the positioning basic information to the information provision device through the communication network;

code for requesting a positioning success or failure information generating unit of the positioning terminal to generate positioning success or failure information indicating whether the terminal side position calculating unit has successfully calculated the position of the positioning terminal or not;

code for requesting a positioning success or failure information transmitting unit of the positioning terminal to transmit the positioning success or failure information to the information provision device through the communication network;

code for requesting a positioning aiding information obtaining unit of the information provision device to obtain the positioning aiding information;

code for requesting a positioning aiding information transmitting unit of the information provision device to transmit the positioning aiding information to the positioning terminal through the communication network;

code for requesting a positioning basic information receiving unit of the information provision device to receive the positioning basic information transmitted by the positioning terminal through the communication network;

code for requesting a positioning success or failure information receiving unit of the information provision device to receive the positioning success or failure information transmitted by the positioning terminal through the communication network;

code for requesting an information provision device side position calculating unit of the information provision device to calculate the position of the positioning terminal based on the positioning aiding information and the positioning basic information; and code for requesting a positioning execution go or no-go determining unit of the information provision device to determine whether the information provision device side position calculating unit performs position calculation of the positioning terminal or not based on the positioning success or failure information.

8. A computer-readable recording medium for recording a control program according to claim 7.

* * * * *